US012634027B2

(12) United States Patent
Dong

(10) Patent No.: US 12,634,027 B2

(45) Date of Patent: May 19, 2026

(54) AUDIO CONTROL METHOD AND DEVICE

(71) Applicant: GUANGDONG OPPO MOBILE TELECOMMUNICATIONS CORP., LTD., Dongguan (CN)

(72) Inventor: Jianli Dong, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 496 days.

(21) Appl. No.: 18/308,206

(22) Filed: Apr. 27, 2023

(65) Prior Publication Data

US 2023/0269012 A1 Aug. 24, 2023

Related U.S. Application Data

(63) Continuation of application No. PCT/CN2020/124551, filed on Oct. 28, 2020.

(51) Int. Cl.

*H04H 20/71* (2008.01)
*H04R 1/10* (2006.01)
*H04R 3/12* (2006.01)
*H04R 5/033* (2006.01)
*H04S 1/00* (2006.01)

(52) U.S. Cl.

CPC ........... *H04H 20/71* (2013.01); *H04R 1/1016* (2013.01); *H04R 1/1041* (2013.01); *H04R 3/12* (2013.01); *H04R 5/033* (2013.01); *H04S 1/007* (2013.01); *H04R 2420/07* (2013.01)

(58) Field of Classification Search

CPC .... H04H 20/71; H04R 1/1016; H04R 1/1041; H04R 3/12; H04R 5/033; H04R 2420/07; H04S 1/007; H04L 65/1083; H04L 65/611; H04W 4/80

See application file for complete search history.

(56) References Cited

U.S. PATENT DOCUMENTS

| | | | | |
|---|---|---|---|---|
| 8,559,651 | B2 | 10/2013 | DeLuca | |
| 2009/0154720 | A1 | 6/2009 | Oki | |
| 2010/0020982 | A1 | 1/2010 | Brown et al. | |
| 2016/0299739 | A1* | 10/2016 | Song | G06F 3/165 |
| 2016/0359925 | A1 | 12/2016 | Song | |
| 2017/0244576 | A1* | 8/2017 | Batra | H04W 56/0025 |

(Continued)

FOREIGN PATENT DOCUMENTS

| | | |
|---|---|---|
| CN | 104883644 | 9/2015 |
| CN | 105491469 | 4/2016 |
| CN | 108702720 | 10/2018 |

(Continued)

OTHER PUBLICATIONS

"Coordinated Set Identification Service: Bluetooth Service Specification," Bluetooth SIG, d1.0r04, Jul. 2020.

(Continued)

*Primary Examiner* — Paul W Huber

(74) *Attorney, Agent, or Firm* — Hodgson Russ LLP

(57) ABSTRACT

The present application relates to an audio control method and device. The audio control method comprises: a control device receives notification information from a first broadcast receiver; and the control device controls, on the basis of the notification information, broadcast isochronous streams (BISs) synchronized by a second broadcast receiver.

18 Claims, 7 Drawing Sheets

(56) References Cited

U.S. PATENT DOCUMENTS

2022/0078541 A1 * 3/2022 Zhu ......................... H04W 4/38

FOREIGN PATENT DOCUMENTS

| | | | |
|---|---|---|---|
| CN | 109379490 | | 2/2019 |
| EP | 3420759 | A1 | 3/2020 |
| EP | 3420759 | B1 | 3/2020 |
| EP | 3883259 | A1 | 9/2021 |
| KR | 100662204 | | 12/2006 |
| WO | 2020132839 | | 7/2020 |

OTHER PUBLICATIONS

"Coordinated Set Identification Profile: Bluetooth Profile Specification," Bluetooth SIG, d1.0r04, Jul. 2020.
"Broadcast Audio Scan Service: Bluetooth Service Specification," Bluetooth SIG, d09r08, Jul. 2020.
"Basic Audio Profile: Bluetooth Profile Specification," Bluetooth SIG, d09r07, Aug. 2020.
WIPO, International Search Report and Written Opinion for PCT/CN2020/124551, Jul. 7, 2021.
"Bluetooth Core Specification: Bluetooth Specification," Bluetooth SIG, v5.2, Dec. 2019.
EPO, Extended European Search Report for EP Application No. 20959087.6, Dec. 4, 2023.

* cited by examiner

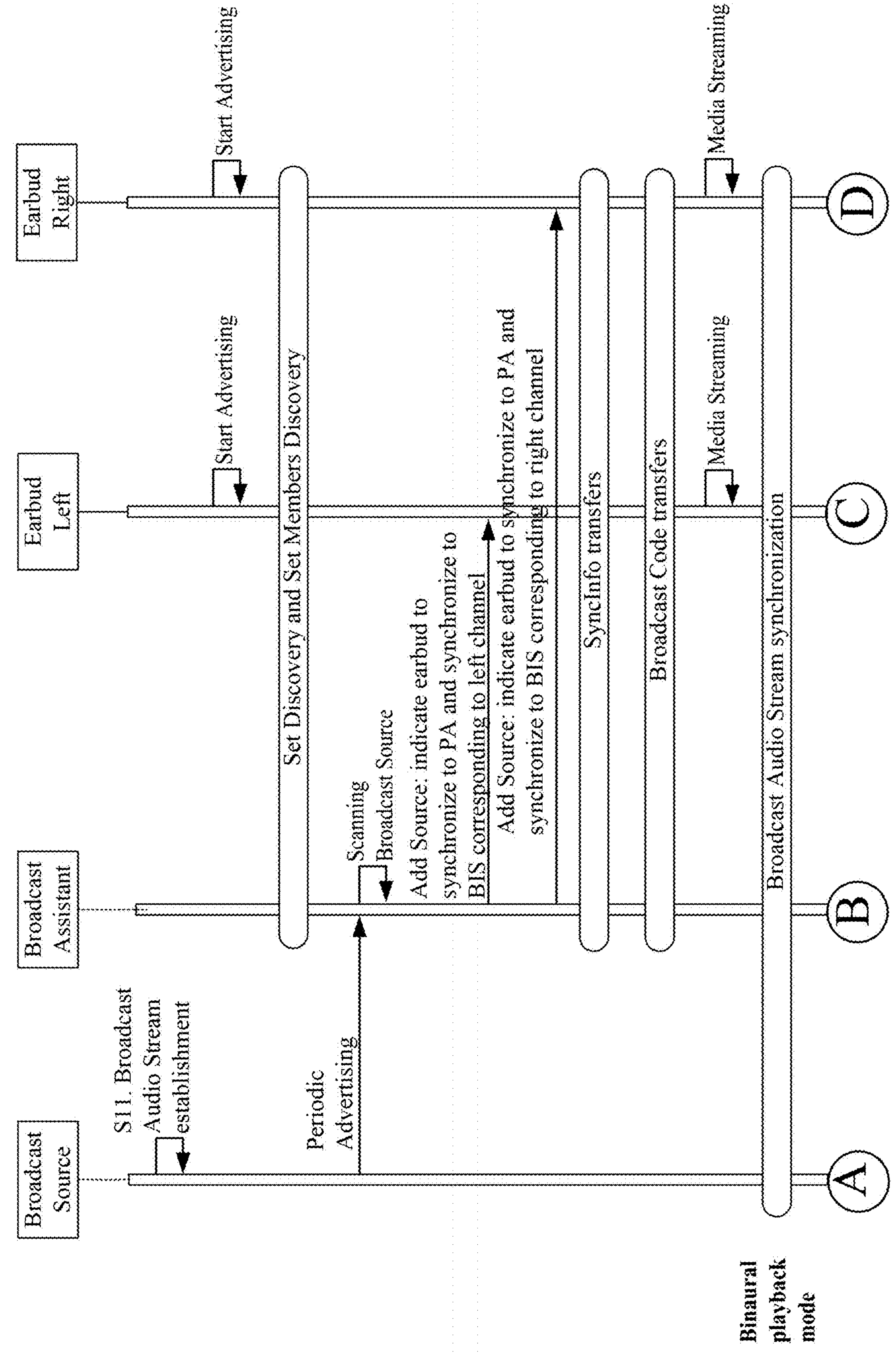
FIG.5 (cont. on next page)

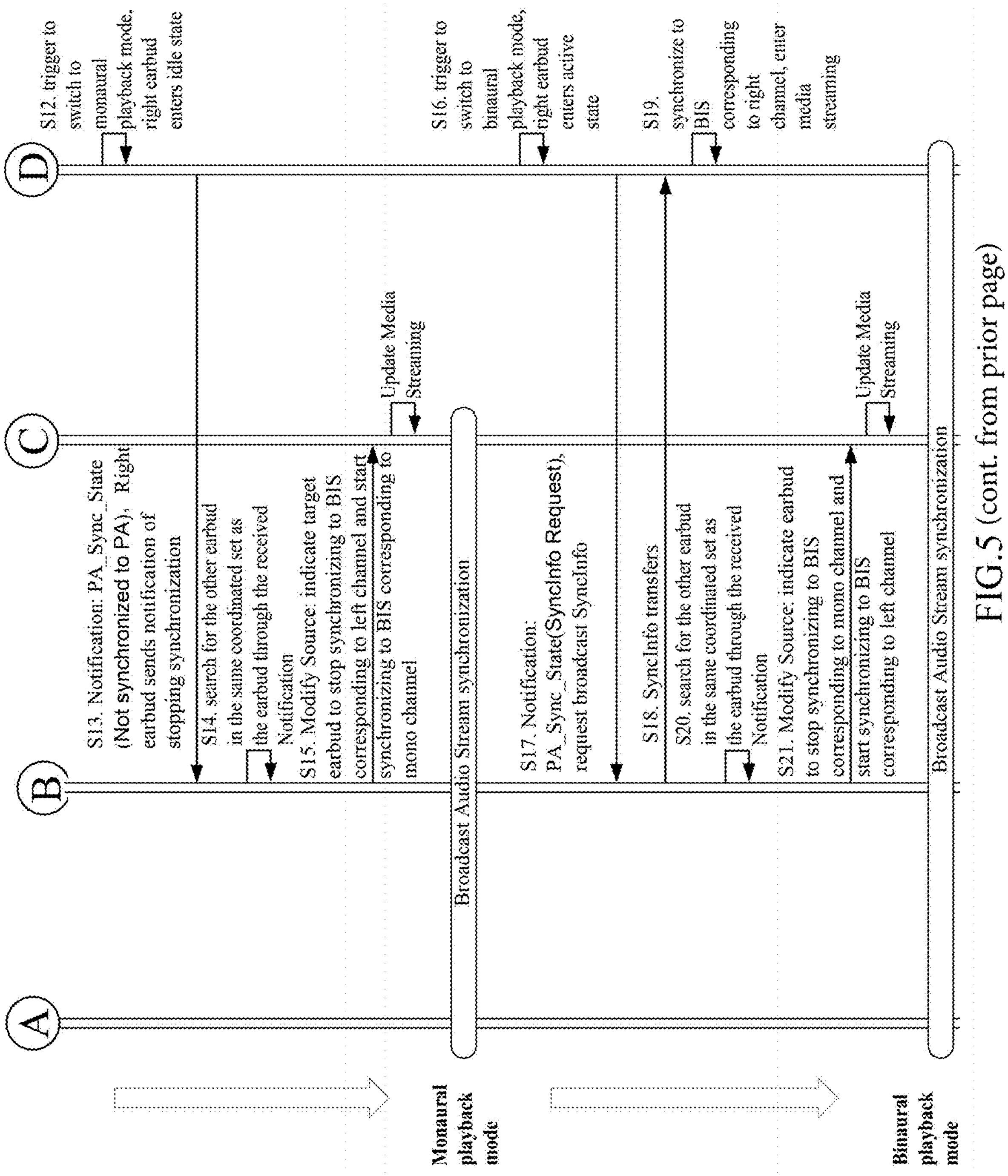
FIG.5 (cont. from prior page)

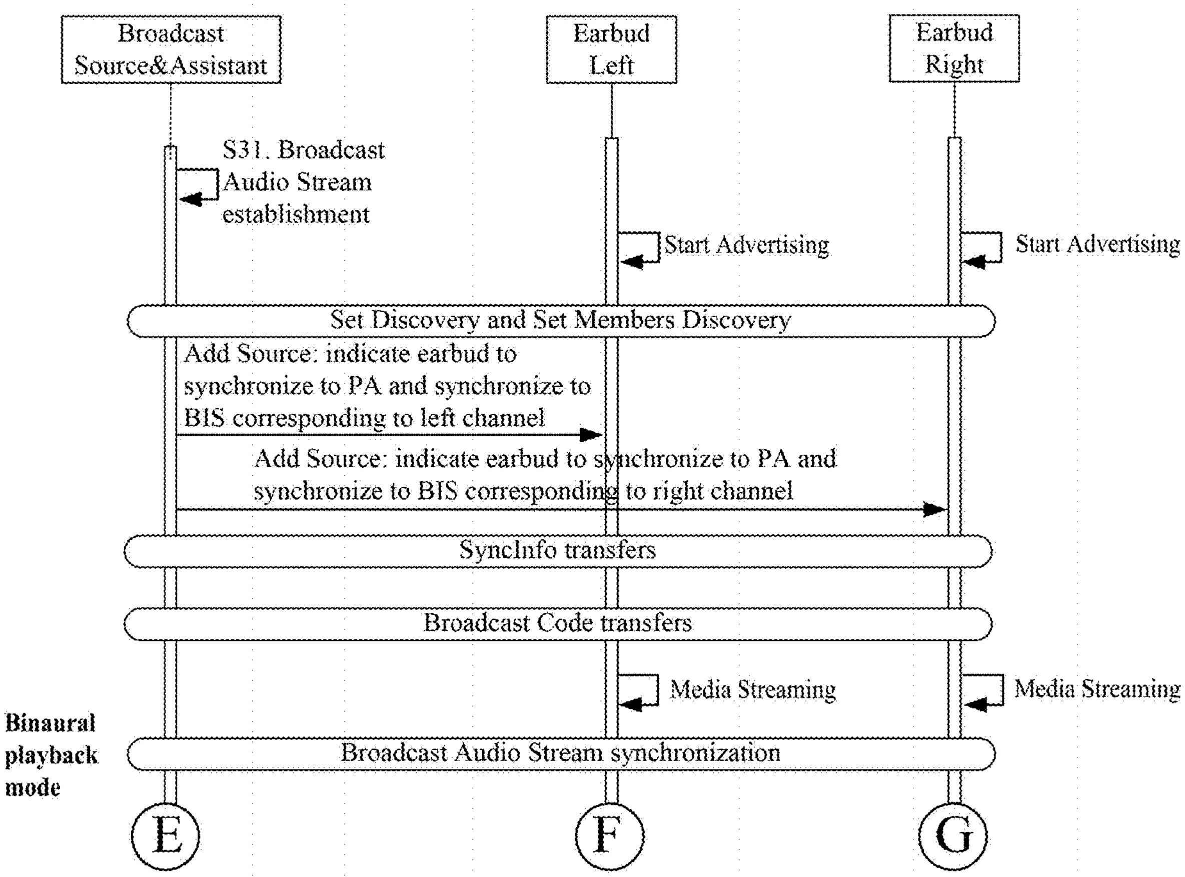
FIG.6 (cont. on next page)

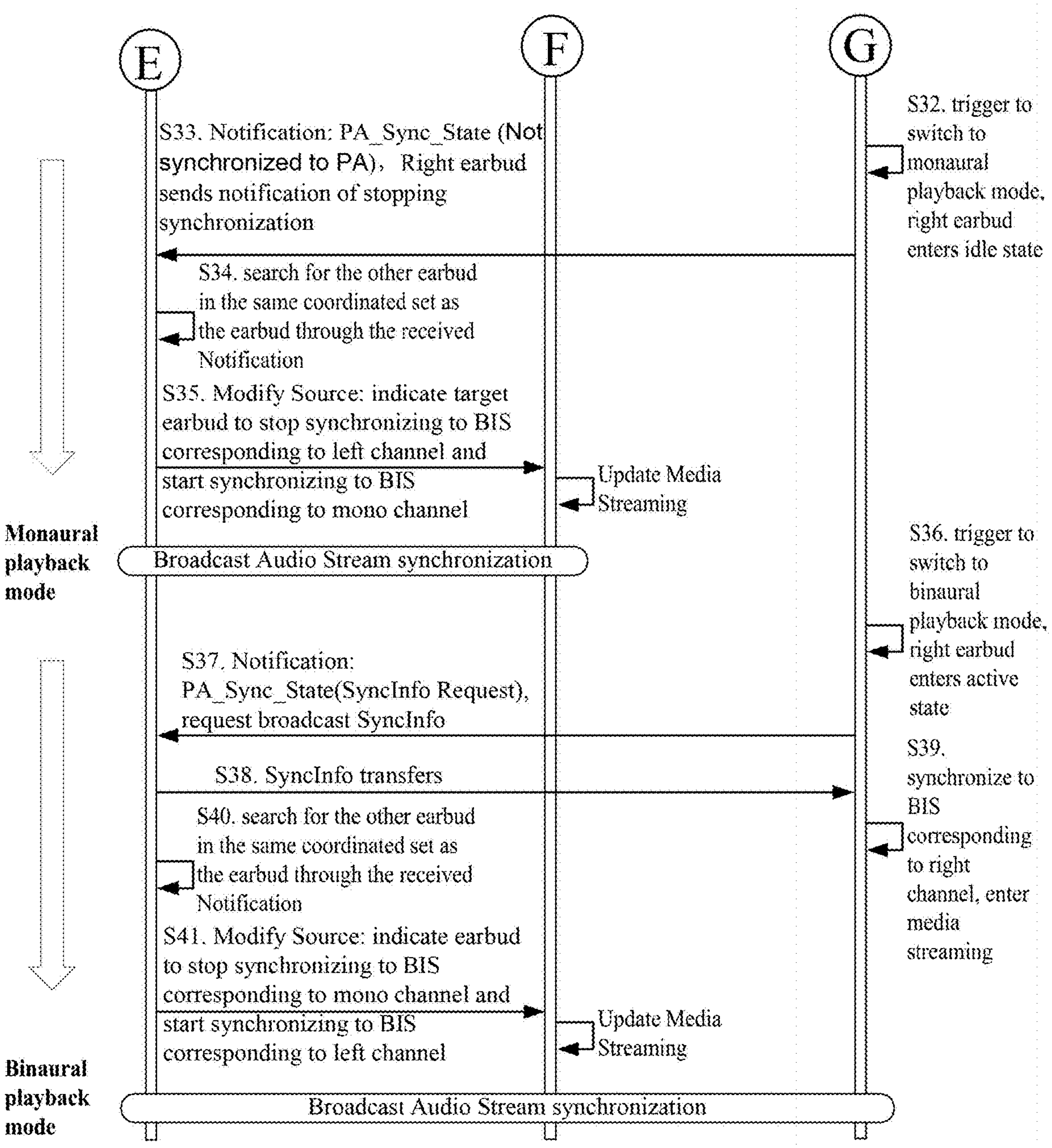
FIG.6 (cont. from prior page)

AUDIO CONTROL METHOD AND DEVICE

CROSS-REFERENCE

This application is a continuation of International Patent Application No. PCT/CN2020/124551, filed Oct. 28, 2020, the entire disclosure of which is incorporated herein by reference.

TECHNICAL FIELD

The present disclosure relates to the communication field, and more specifically, to an audio control method and device.

BACKGROUND

Bluetooth Low Energy (BLE), also known as Low Energy Bluetooth, can be used in the field of healthcare, sports and fitness, beacons, security, home entertainment and others. For example, a Bluetooth headset can establish a wireless connection with a music playback device to play music. For another example, the Bluetooth headset can establish a wireless connection with a mobile phone to make and receive calls.

SUMMARY

Embodiments of the present disclosure provide an audio control method and device, which can conveniently support audio control of the device.

An embodiment of the present disclosure provides an audio control method, including:

receiving, by a control device, notification information from a first broadcast sink; and controlling, by the control device based on the notification information, a Broadcast Isochronous Stream (BIS) synchronized to by a second broadcast sink.

An embodiment of the present disclosure provides an audio control method, including:

sending, by a first broadcast sink, notification information to a control device;

wherein the notification information is used to indicate the control device to control a Broadcast Isochronous Stream (BIS) synchronized to by a second broadcast sink.

An embodiment of the present disclosure provides an audio control method, including:

receiving, by a second broadcast sink, indication information from a control device, wherein the indication information is determined by the control device based on notification information of a first broadcast sink; and synchronizing, by the second broadcast sink based on the indication information, to a Broadcast Isochronous Stream (BIS).

An embodiment of the present disclosure provides a control device, including:

a receiving unit, configured to receive notification information from a first broadcast sink; and a control unit, configured to control a Broadcast Isochronous Stream (BIS) synchronized to by a second broadcast sink based on the notification information.

An embodiment of the present disclosure provides a first broadcast sink, including:

a sending unit, configured to send notification information to a control device;

wherein the notification information is used to indicate the control device to control a Broadcast Isochronous Stream (BIS) synchronized to by a second broadcast sink.

An embodiment of the present disclosure provides a second broadcast sink, including:

a receiving unit, configured to receive indication information from a control device, wherein the indication information is determined by the control device based on notification information of a first broadcast sink; and a control unit, configured to synchronize to a Broadcast Isochronous Stream (BIS) based on the indication information.

An embodiment of the present disclosure provides a control device, including a processor and a memory. The memory is configured to store a computer program, and the processor is configured to call and run the computer program stored in the memory to cause the control device to perform the above-mentioned audio control method.

An embodiment of the present disclosure provides an audio receiving device, including a processor and a memory. The memory is configured to store a computer program, and the processor is configured to call and run the computer program stored in the memory to cause the audio receiving device to perform the above-mentioned audio control method.

An embodiment of the present disclosure provides a chip configured to implement the above audio control method.

Specifically, the chip includes: a processor, configured to call and run a computer program from a memory to cause a device installed with the chip to perform the audio control method as described above.

An embodiment of the present disclosure provides a computer-readable storage medium for storing a computer program which, when being executed by a device, causes the device to perform the above-mentioned audio control method.

An embodiment of the present disclosure provides a computer program product including computer program instructions that cause a computer to perform the audio control method as described above.

An embodiment of the present disclosure provides a computer program which, when running on a computer, causes the computer to perform the audio control method as described above.

BRIEF DESCRIPTION OF THE DRAWINGS

FIG. 5 is a schematic flowchart of scheme 1.

FIG. 6 is a schematic flowchart of scheme 2.

DETAILED DESCRIPTION

Figure 1A:
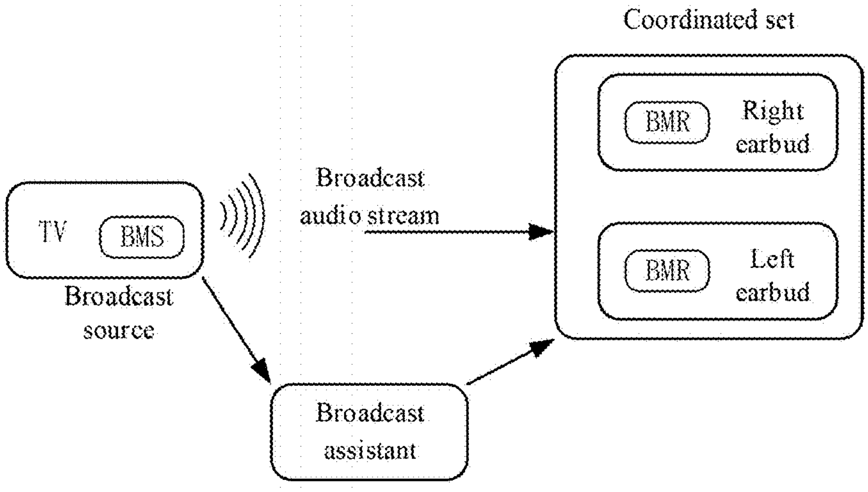
FIG. 1*a* and FIG. 1B are schematic diagrams of application scenarios according to embodiments of the present disclosure.

The technical solutions in the embodiments of the present disclosure will be described below in conjunction with the drawings in the embodiments of the present disclosure.

The technical solutions of the embodiments of the present disclosure can be applied to various communication systems such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, a Non-Terrestrial Network (NTN) system, a Universal Mobile Telecommunication System (UMTS), a Wireless Local Area Network (WLAN), a Wireless Fidelity (Wi-Fi), a 5th-Generation (5G) communication system or other communication systems.

Generally, traditional communication systems support a limited number of connections and are easy to implement. However, with the development of communication technologies, mobile communication systems will not only support traditional communications, but will also support, for example, Device to Device (D2D) communication, Machine to Machine (M2M) communication, Machine Type Communication (MTC), Vehicle to Vehicle (V2V) communication, Vehicle to everything (V2X) communication, etc. The embodiments of the present disclosure can also be applied to these communication systems.

Optionally, the communication system in the embodiments of the present disclosure can be applied to a carrier aggregation (CA) scenario, a dual connectivity (DC) scenario, or a standalone (SA) deployment scenario.

Optionally, the communication system in the embodiments of the present disclosure may be applied to an unlicensed spectrum, where the unlicensed spectrum may also be considered as a shared spectrum; or, the communication system in the embodiments of the present disclosure may also be applied to a licensed spectrum, where the licensed spectrum can also be considered as an unshared spectrum.

Various embodiments are described in conjunction with the network device and the terminal device in the embodiments of the present disclosure, where the terminal device may also be referred to as User Equipment (UE), an access terminal, a subscriber unit, a subscriber station, a mobile station, a remote station, a remote terminal, a mobile device, a user terminal, a terminal, a wireless communication device, a user agent, a user device, or the like.

The terminal device may be a station (ST) in the WLAN, or may be a cellular phone, a cordless phone, a Session Initiation Protocol (SIP) phone, a Wireless Local Loop (WLL) station, a personal digital Personal Digital Assistant (PDA) device, a handheld devices with wireless communication capabilities, a computing device or other processing devices connected to a wireless modem, an in-vehicle device, a wearable device, a terminal device in next-generation communication systems such as a NR network, or a terminal device in a future evolved public land mobile network (PLMN) network, etc.

In the embodiments of the present disclosure, the terminal device can be deployed on land, including indoor or outdoor, handheld, wearable, or vehicle-mounted; or it can be deployed on water (such as on a ship, etc.); or it can be deployed in the air (such as on an airplane, a balloon, a satellite, etc.).

In the embodiments of the present disclosure, the terminal device may be a mobile phone, a Pad, a computer with a wireless transceiving function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example instead of a limitation, in the embodiments of the present disclosure, the terminal device may also be a wearable device. The wearable device can also be referred to as a wearable smart device, which is a general term for wearable devices which are designed and developed by using wearable technology to intelligently design and develop everyday wear, such as glasses, gloves, watches, clothing and shoes. The wearable device is a portable device that is directly worn on the body or integrated into user's clothes or accessories. The wearable device is not only a hardware device, but also realizes powerful functions through software support, data interaction, and cloud interaction. In a broad sense, the wearable smart device includes full-featured and large-sized devices of which complete or partial functions can be achieved without relying on smart phones, such as smart watches or smart glasses, and devices which focus on only a certain type of application function and need to cooperate with other devices such as smart phones, such as various smart bracelets and smart jewelry for physical sign monitoring.

In the embodiments of the present disclosure, the network device can be a device used to communicate with a mobile device. The network device can be an access point (AP) in WLAN, a Base Transceiver Station (BTS) in GSM or CDMA, or a NodeB (NB) in WCDMA, and can also be an Evolutional Node B (eNB or eNodeB) in LTE, a relay station, an access point, a vehicle-mounted device, a wearable device, a network device (gNB) in a NR network, a network device in future evolutional PLMN network, a network device in a NTN network, or the like.

As an example but not a limitation, in the embodiments of the present disclosure, the network device may have a mobile feature, for example, the network device may be a moving device. Optionally, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, etc. Optionally, the network device may also be a base station set in a location such as on land or in water.

In the embodiments of the present disclosure, the network device may provide services for a cell, and the terminal device communicates with the network device through transmission resources (for example, frequency domain resources, or spectrum resources) used by the cell. The cell may be a cell corresponding to the network device (e.g., a cell corresponding to the base station), or belong to a macro base station or a base station corresponding to a small cell. The small cell herein can include a Metro cell, a Micro cell, a Pico cell, a Femto cell, etc., which are characterized in small coverage and low transmission power, and are suitable for providing high-rate data transmission services.

It should be understood that the terms “system” and “network” are often used interchangeably herein. The term “and/or” used herein is merely to describe relative relationships of relative objects, indicating that there can be three kinds of relationships. For example, A and/or B can indicate three cases where A exists alone, A and B exist simultaneously, or B exists alone. In addition, the character “/” used herein generally indicates that the related objects before and after this character are in an “or” relationship.

It should be understood that “indicate” mentioned in the embodiments of the present disclosure may be a direct indication or an indirect indication, or may represent an associated relationship. For example, if A indicates B, it may represent that A directly indicates B, for example, B can be obtained from A; or it may represent that A indicates B indirectly, for example, A indicates C, and B can be obtained from C; or it may represent that there is an associated relationship between A and B.

In the description of the embodiments of the present disclosure, the term “corresponding” may indicate that there is a direct or indirect corresponding relationship between two objects, or may indicate that there is an associated relationship, a relationship of indicating and being indicated, or a relationship of configuring and being configured between the two objects, and so on.

In order to facilitate the understanding of the technical solutions of the embodiments of the present disclosure, relevant technologies of the embodiments of the present disclosure are described below. The following relevant technologies can be arbitrarily combined with the technical solutions of the embodiments of the present disclosure as optional solutions, which all fall within the protection scope of the embodiments of the present disclosure.

LE Audio is a new generation of Bluetooth audio technology that can provide more powerful Bluetooth functions for the wireless audio market, including:

new higher quality and more efficient audio codec;

ability to transmit multiple audio streams simultaneously;

new Bluetooth audio broadcast function; and ability to transmit audio over Bluetooth Low Energy.

In an example, referring to FIG. 1*a*, a LE audio system may include three roles of a Broadcast Source, a Broadcast Sink and a Broadcast Assistant. The roles of the broadcast source and the broadcast assistant may be located on different devices. The broadcast source may also be called a broadcast audio source, and may be provided in a terminal device having an audio playback function, such as a television (TV) and a mobile phone. The device where the broadcast source is located can serve as a Broadcast Media Sender (BMS). The Broadcast Assistant can be provided on a device having a control function. The broadcast sink may also be called a broadcast audio sink, which includes headsets such as Earbud Left/Right and other devices. The device where the broadcast audio sink is located can serve as a Broadcast Media Receiver (BMR). The broadcast audio sink permits an external device, the broadcast assistant, to complete the work of scanning and detecting broadcast audio sources on behalf of itself. The broadcast assistant detects the broadcast and directly sends synchronization information of the broadcast audio source to the two earbuds through the LE connection, to start binaural playback. With the assistance of the broadcast assistant, switching between monaural and binaural modes can be performed.

Figure 1B:
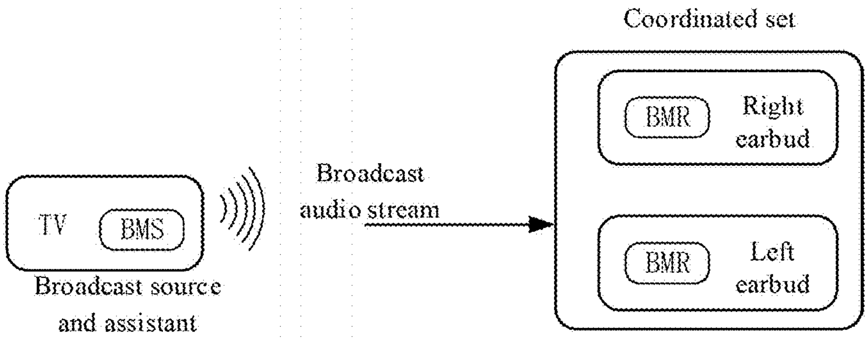

In another example, as shown in FIG. 1B, the basic principle of this example is the same as that in FIG. 1*a*, and the primary difference is that the Broadcast Source and Broadcast Assistant roles of the LE audio system can be located on the same device. The device where the broadcast source and broadcast assistant are located can serve as the BMS. The device where the broadcast audio sink is located can serve as the BMR.

In an embodiment of the present disclosure, the broadcast assistant indicates the left and right earbuds (Earbud Left/Right) to synchronize to left and right channels respectively to enter the binaural playback mode.

If the user triggers to switch to the monaural mode, the broadcast assistant receives notification information sent by the earbud device that stops the playback, searches for another earbud that is in the same Coordinated Set as the earbud, and indicates that earbud to stop synchronizing to the BIS corresponding to the current channel and start synchronizing to the BIS corresponding to a mono channel. The mono channel here refers to a single stereo channel, or a left-right mixed channel.

If the user switches to the binaural mode, the newly-connected earbud sends notification information to request for broadcast synchronization information. The broadcast assistant sends the synchronization information (SyncInfo) to the earbud, and the earbud starts to synchronize to the BIS corresponding to a target channel (left channel or right channel). The broadcast assistant searches for the other earbud that is in the same coordinated set as the earbud, and indicates that earbud to stop synchronizing to the BIS corresponding to the mono channel and start to synchronize to the BIS corresponding to the target channel (left channel or right channel).

In the Profile/Service related to LE Audio, there is not yet a switching mechanism for TWS headsets between binaural and monaural playback modes based on broadcast audio.

Figure 2:
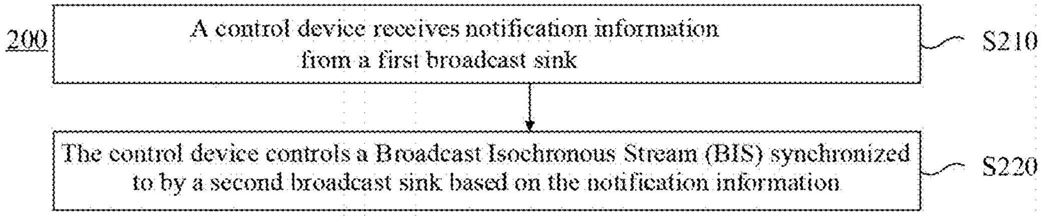
FIG. 2 is a schematic flowchart of an audio control method according to an embodiment of the present disclosure.

FIG. 2 is a schematic flowchart of an audio control method 200 according to an embodiment of the present disclosure. The method can optionally be applied to the systems shown in FIGS. 1*a* and 1*b*, but is not limited thereto. The method includes at least some of the following contents.

In S210, a control device receives notification information from a first broadcast sink.

In S220, the control device controls a Broadcast Isochronous Stream (BIS) synchronized to by a second broadcast sink based on the notification information.

Exemplarily, the control device such as the broadcast assistant may receive a notification message from the first broadcast sink such as a Bluetooth headset. The notification message may include at least one of an identifier of the first broadcast sink, an identifier of a coordinated set to which the first broadcast sink belongs, or an identifier of the second broadcast sink. After finding the corresponding second broadcast sink based on the identifier in the notification message, the control device may send a control command to the second broadcast sink, so as to control the second broadcast sink to synchronize to the BIS.

Optionally, the method further includes:

the control device searches for a second broadcast sink in the same coordinated set as the first broadcast sink.

Exemplarily, the coordinated set may be used for a group of devices configured to support a particular scenario. For example, the coordinated set can include a pair of hearing aids, a pair of headsets (earbuds), or a speaker set, and devices in the coordinated set can receive multi-channel audio and respond to the control command in a coordinated manner. The coordinated set may have corresponding identification. The notification information may include the identification of the coordinated set. After receiving the notification message, the control device may determine the coordinated set based on the identification of the coordinated set to which the first broadcast sink belongs, and then search for the identification of the second broadcast sink included in the coordinated set, and then the control device can control the BIS synchronized to by the second broadcast sink.

Optionally, the notification information is used to notify the control device that the first broadcast sink stops synchronizing to Periodic Advertising, and based on the notification information, the control device controls the BIS that the second broadcast sink synchronizes to, including:

the control device indicates the second broadcast sink to stop synchronizing to the BIS corresponding to a second channel, and to start synchronizing to the BIS corresponding to the mono channel.

Exemplarily, the periodic advertising may include multiple types of BISs, for example, a BIS corresponding to the left channel, a BIS corresponding to the right channel, and a BIS corresponding to the mono channel. That first broadcast sink stops synchronizing to the periodic advertising means that it stops synchronizing to the BIS.

In a scenario, if it needs to switch from the binaural playback mode to the monaural playback mode, the first broadcast sink, such as an earbud, can also notify the control device that it needs to switch to the monaural playback mode. There are many ways for the notification. For example, in the monaural playback mode, if the control device receives notification information that the first broadcast sink stops synchronizing to the periodic advertising, that is, the first broadcast sink stops playing back the BIS corresponding to the first channel, it can be determined that it needs to switch to the monaural playback mode. For another example, the notification message carries the indication information of the monaural playback mode. For still another example, a trigger control is provided on the earbud, and when the trigger control is triggered, indication information for mode switching is sent. For still another example, the earbud is provided with a sensor such as an infrared sensor, a gravity sensor, etc., which can detect a state where the earbud is taken out of the ear or inserted into the ear, and then the indication information for the mode switching can be sent. Further, if one of the two earbuds in the binaural playback mode is taken out of the ear, the removed earbud may send indication information for switching to the monaural playback mode.

In the case where it need to switch to the monaural playback mode, the control device may send a control command to the second broadcast sink. The control command may indicate the second broadcast sink to stop playing the BIS corresponding to the second channel and start synchronizing to the BIS corresponding to the mono channel.

Optionally, the notification information is used to request the control device to send broadcast synchronization information, and the method further includes:

the control device sends the broadcast synchronization information to the first broadcast sink to indicate the first broadcast sink to start synchronizing to the BIS corresponding to the first channel.

In another scenario, if it needs to switch from the monaural playback mode to the binaural playback mode, the first broadcast sink, such as the earbud, can also notify the control device that it needs to switch to the binaural playback mode. There are many ways for the notification. For example, in the monaural playback mode, if the control device receives notification information that the first broadcast sink requests the control device to send broadcast synchronization information, it can be determined that it needs to switch to the binaural playback mode. For another example, the notification message carries the indication information of the binaural playback mode. For still another example, a trigger control is provided on the earbud, and when the trigger control is triggered, indication information for the mode switching is sent. For still another example, the earbud is provided with a sensor such as an infrared sensor, a gravity sensor, etc., which can detect the state that the earbud is taken out of the ear or inserted into the ear, and then the indication information for the mode switching can be sent. Further, if an earbud paired with the other earbud in the monaural playback mode is inserted into the ear, the earbud inserted into the ear can send indication information for switching to the binaural mode.

Optionally, the control device controls the BIS synchronized to by the second broadcast sink based on the notification information, including:

the control device indicates the second broadcast sink to stop synchronizing to the BIS corresponding to the mono channel, and to start synchronizing to the BIS corresponding to the second channel.

Exemplarily, if it switches from the monaural playback mode to the binaural playback mode, the control device not only sends the broadcast synchronization information to the first broadcast sink, but also sends a control command to the second broadcast sink. The control command may instruct the second broadcast sink to stop synchronizing to the BIS corresponding to the mono channel and start synchronizing to the BIS corresponding to the second channel. In this way, the first broadcast sink synchronizes to the BIS corresponding to the first channel, and the second broadcast sink synchronizes to the BIS corresponding to the second channel, and thus it successfully switches to the binaural playback mode.

Optionally, the notification information includes at least one of a source address type, a source address and an advertising set identification (Advertising_SID). The advertising set identification may also be referred to as a broadcast set identification. For example, the address type, the address, and the SID included in the notification information can be used to identify a broadcast source; the address type and address can be used to identify the device of the broadcast source; and the SID can be used to identify a specific broadcast instance of the device (a device may be deployed with more than one broadcast instance).

Optionally, the first broadcast sink and the second broadcast sink are earbud devices.

Optionally, the first channel is a left channel, the second channel is a right channel, the first broadcast sink is a left earbud device, and the second broadcast sink is a right earbud device.

Optionally, the first channel is a right channel, the second channel is a left channel, the first broadcast sink is a right earbud device, and the second broadcast sink is a left earbud device.

Optionally, the method further includes:

the control device establishes a synchronization relationship between the broadcast source and the first and second broadcast sinks, so as to instruct the first broadcast sink to synchronize to the BIS corresponding to the first channel and the second broadcast sink to synchronize to the BIS corresponding to the second channel.

Exemplarily, the control device may send a control command to a group of broadcast sinks in the same coordinated set, so as to establish the synchronization relationship between the broadcast source such as an audio playback device, for example a TV or a mobile phone, and a group of broadcast sinks. For example, the control device sends to the left earbud device a control command of synchronizing to the BIS corresponding to the left channel, and sends to the right earbud device a control command of synchronizing to the BIS corresponding to the right channel. As such, it enables the binaural playback mode for the left and right earbud devices.

Optionally, the control device is a broadcast assistant.

Exemplarily, the broadcast assistant can be provided in the control device, and the broadcast source can be provided in another device. In this way, the broadcast assistant and broadcast source can be independent devices. As such, the broadcast assistant discovers and synchronizes to the broadcast source through scanning, a connection can be established between the broadcast assistant and the broadcast sink, and the broadcast assistant sends synchronization information to the broadcast sink via the connection.

Optionally, the control device includes a broadcast source and a broadcast assistant.

Exemplarily, the broadcast assistant and the broadcast source may be provided in the same device, such as the control device in the embodiment of the present disclosure.

Optionally, the periodic advertising received by the broadcast assistant from the broadcast source includes at least one of the following BISs:

a BIS corresponding to the first channel;

a BIS corresponding to the second channel; and a BIS corresponding to the mono channel.

Optionally, the broadcast source is a broadcast audio source.

In an embodiment of the present disclosure, by controlling the BIS synchronized to by the second broadcast sink based on the notification information from the first broadcast sink, the convenient audio control of the device can be supported. For example, for a group of Bluetooth earbuds, the BIS that one earbud synchronizes to can be controlled based on the notification information of the other earbud, so that convenient and fast switching between the binaural playback mode and the monaural playback mode can be performed, which optimizes the audio playback effect and improves the user experience.

Figure 3:
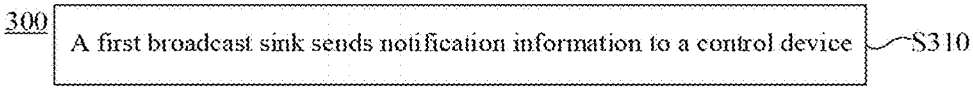
FIG. 3 is a schematic flowchart of an audio control method according to another embodiment of the present disclosure.

FIG. 3 is a schematic flowchart of an audio control method 300 according to an embodiment of the present disclosure. The method can optionally be applied to the systems shown in FIGS. 1*a* and 1*b*, but is not limited thereto. The method includes at least some of the following contents.

In S310, a first broadcast sink sends notification information to a control device.

The notification information is used to indicate the control device to control a Broadcast Isochronous Stream (BIS) synchronized to by a second broadcast sink.

Optionally, the second broadcast sink is in the same coordinated set as the first broadcast sink.

Optionally, the method further includes:

the first broadcast sink stops synchronizing to periodic advertising, and the notification information is used to notify the control device that the first broadcast sink stops synchronizing to the periodic advertising.

Optionally, the notification information is used to request the control device to send broadcast synchronization information, and the method further includes:

the first broadcast sink receives the broadcast synchronization information from the control device, and starts to synchronize to the BIS corresponding to a first channel.

Optionally, the first broadcast sink and the second broadcast sink are earbud devices.

Optionally, the first channel is a left channel, the second channel is a right channel, the first broadcast sink is a left earbud device, and the second broadcast sink is a right earbud device.

Optionally, the first channel is a right channel, the second channel is a left channel, the first broadcast sink is a right earbud device, and the second broadcast sink is a left earbud device.

Optionally, the control device is a broadcast assistant.

Optionally, the control device includes a broadcast source and a broadcast assistant.

Optionally, the periodic advertising received by the broadcast assistant from the broadcast source includes at least one of the following BISs:

a BIS corresponding to the first channel;

a BIS corresponding to the second channel; and a BIS corresponding to the mono channel.

Optionally, the broadcast source is a broadcast audio source, and the broadcast sink is a broadcast audio receiver.

For a specific example of the method 300 performed by the first broadcast sink in the embodiment, reference may be made to relevant descriptions regarding the first broadcast sink such as the first earbud device in the foregoing method 200, and details are not repeated here for the sake of brevity.

Figure 4:
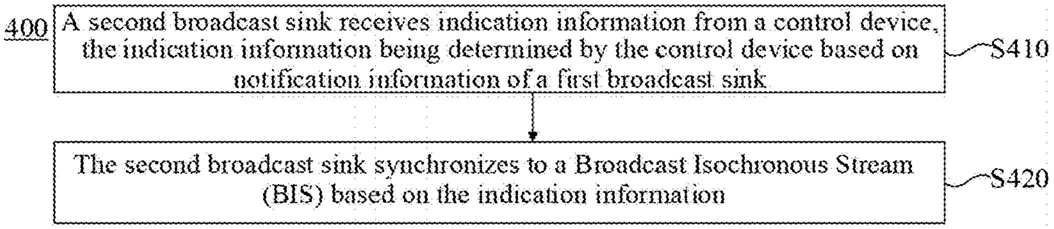
FIG. 4 is a schematic flowchart of an audio control method according to still another embodiment of the present disclosure.

FIG. 4 is a schematic flowchart of an audio control method 400 according to an embodiment of the present disclosure. The method can optionally be applied to the systems shown in FIGS. 1*a* and 1*b*, but is not limited thereto. The method includes at least some of the following contents.

In S410, a second broadcast sink receives indication information from a control device, where the indication information is determined by the control device based on notification information of a first broadcast sink.

In S420, the second broadcast sink synchronizes to a Broadcast Isochronous Stream (BIS) based on the indication information.

Optionally, the notification information is used to notify the control device that the first broadcast sink stops synchronizing to periodic advertising, and the second broadcast sink synchronizes to the BIS based on the indication information, including:

the second broadcast sink stops synchronizing to the BIS corresponding to a second channel, and starts synchronizing to the BIS corresponding to a mono channel.

Optionally, the notification information is used to request the control device to send broadcast synchronization information, and the second broadcast sink synchronizes to the BIS based on the indication information, including:

the second broadcast sink stops synchronizing to the BIS corresponding to a mono channel, and starts synchronizing to the BIS corresponding to a second channel.

Optionally, the first broadcast sink and the second broadcast sink are earbud devices.

Optionally, the first channel is a left channel, the second channel is a right channel, the first broadcast sink is a left earbud device, and the second broadcast sink is a right earbud device.

Optionally, the first channel is a right channel, the second channel is a left channel, the first broadcast sink is a right earbud device, and the second broadcast sink is a left earbud device.

Optionally, the control device is a broadcast assistant.

Optionally, the control device includes a broadcast source and a broadcast assistant.

Optionally, the periodic advertising received by the broadcast assistant from the broadcast source includes at least one of the following BISs:

a BIS corresponding to the first channel;

a BIS corresponding to the second channel; and a BIS corresponding to the mono channel.

Optionally, the broadcast source is a broadcast audio source, and the broadcast sink is a broadcast audio receiver.

For a specific example of the method 400 performed by the second broadcast sink in the embodiment, reference may be made to relevant descriptions regarding the second broadcast sink such as the second earbud device in the foregoing method 200, and details are not repeated here for the sake of brevity.

In an application scenario, the audio control method of the present disclosure can be suitable for switching between monaural playback and binaural playback based on Low Energy (LE) broadcast audio. For example, it is suitable for switching between the monaural playback and binaural playback for True Wireless Stereo (TWS) Bluetooth headsets.

LE Audio technology includes a series of Profiles/Services, each of the services is responsible for a different function. The main Profiles/Services involved in LE broadcast audio include Basic Audio Profile (BAP) and Broadcast Audio Scan Service (BASS), but there is no monaural-binaural switching mechanism set for the TWS products. In products such as TWS headsets, switching between monaural and binaural playback modes is an important function.

The embodiments of the present disclosure can provide a switching mechanism between the binaural and monaural playback modes of the TWS headsets based on the broadcast audio, examples of which are as follows.

Scheme 1:

The broadcast source configures periodic advertising, which can contain three BIS audio streams corresponding to a left channel, a right channel and a mono channel, respectively.

This scheme is applicable to the situation that the broadcast source and the broadcast assistant are located in different devices. As shown in FIG. 5, the process of the scheme can mainly include the following.

In S11, a broadcast sink such as Earbud Left/Right establishes a synchronization relationship (that is, Broadcast Audio Stream synchronization) with the broadcast source, with assistance of the broadcast assistant. The Earbud Left and Earbud Right synchronize to the BISs corresponding to the left and right channels respectively, and play music in a binaural mode. For example, the Earbud Left and Earbud Right respectively start advertising.

In addition, the broadcast assistant can perform processes of Coordinated Set Discovery and Set Members Discovery.

The broadcast assistant scans the broadcast source, and receives the Periodic Advertising (PA) sent by the broadcast source to the broadcast assistant. If the broadcast assistant detects Add Source by scanning, it can instruct the earbud to synchronize to the PA and synchronize to the BIS corresponding to a target channel. For example, it instructs the left earbud to synchronize to the PA and synchronize to the BIS corresponding to the left channel, and instructs the right earbud to synchronize to the PA and synchronize to the BIS corresponding to the right channel.

The broadcast assistant transfers synchronization information (SyncInfo transfers) to the left and right earbuds, and transfers broadcast codes (Broadcast Code transfers). The left and right earbuds play Media Streaming respectively.

In the binaural playback mode, the Broadcast Audio Stream synchronization is performed between the broadcast source and the left and right earbuds.

In S12, the user triggers switching to the monaural playback mode. For example, taking off an earbud or triggering a mode switching control by the user, etc., may trigger switching to the monaural playback mode, for example, causing the right earbud to enter an idle state. In the following, triggering of the right earbud is described by way of example, and triggering of the left earbud is of similar principles, the example of which is not repeated here.

In S13, the right earbud sends notification information to notify the broadcast assistant that the right earbud has stopped synchronizing to the periodic advertising. For example, the notification message sent by the right earbud includes a periodic advertising synchronization state PA_Sync_State (Not synchronized to PA), indicating that it is not synchronized to the periodic advertising.

In S14, the broadcast assistant searches for the other earbud (which may be called a target earbud) that is in the same coordinated set as the earbud through the received notification information.

In S15, the broadcast assistant modifies the broadcast source, instructs the found target earbud to stop synchronizing to the BIS corresponding to the left channel, and to start synchronizing to the BIS corresponding to the mono channel, to enter the monaural playback mode. The target earbud, such as the left earbud, updates media streaming. In this mode, the broadcast audio stream synchronization is performed between the broadcast source and the left earbud.

In S16, the user triggers to switch to the binaural playback mode. For example, the user can trigger switching to the binaural playback mode by wearing the other earbud in the monaural playback mode or triggering the mode switching control. Assuming that the user still triggers the right earbud, the binaural playback mode is triggered, and the right earbud enters an active state.

In S17, the right earbud sends notification information to the broadcast assistant, so as to request the broadcast assistant to send broadcast synchronization information. The notification information may carry a source address type (Source_Address_Type), a source address (Source_Address), an advertising set identification (Advertising_SID), and the like. For example, the notification message from the right earbud may also include a periodic advertising synchronization state PA_Sync_State (SyncInfo Request), indicating that the right earbud requests the broadcast synchronization information.

In S18, the broadcast assistant sends the broadcast synchronization information (SyncInfo) to the right earbud.

In S19, the right earbud starts to synchronize to the BIS corresponding to the right channel, to enter a music play-playback state (playing Media Streaming).

In S20, the broadcast assistant searches for the other earbud that is in the same coordinated set as the earbud through the received notification information.

In S21, the broadcast assistant can modify the broadcast source, instructs the found target earbud to stop synchronizing to the BIS corresponding to the mono channel, and to start synchronizing to the BIS corresponding to the left channel, to enter the binaural playback mode. The target earbud, such as the left earbud, updates media streaming. In this mode, the broadcast audio stream synchronization is performed between the broadcast source and the left and right earbuds.

Scheme 2:

The broadcast source configures periodic advertising, which can contain three BIS audio streams corresponding to a left channel, a right channel and a mono channel, respectively.

This scheme is applicable to the situation where the Broadcast Source and the Broadcast Assistant are on the same device. As shown in FIG. 6, the process of this scheme mainly includes the following.

In S31, the broadcast sink such as Earbud Left/Right establishes a synchronization relationship (that is, Broadcast Audio Stream synchronization) with the broadcast source, with the assistance of the broadcast assistant. The left earbud and the right earbud are synchronized to the BISs corresponding to the left and right channels respectively, and play music in the binaural mode.

The broadcast assistant and broadcast source can perform processes of Coordinated Set Discovery and Set Members Discovery.

In S32, the user triggers switching to the monaural playback mode.

In S33, the right earbud sends notification information to notify the broadcast assistant that the right earbud has stopped synchronizing to the periodic advertising.

In S34, the broadcast assistant searches for the other earbud that is in the same coordinated set as the earbud through the received notification information.

In S35, the broadcast assistant instructs the found target earbud to stop synchronizing to the BIS corresponding to the left channel, and to start synchronizing to the BIS corresponding to the mono channel, to enter the monaural playback mode.

In S36, the user triggers switching to the binaural playback mode.

In S37, the right earbud sends notification information to the broadcast assistant, so as to request the broadcast assistant to send broadcast synchronization information. The notification information may carry a source address type (Source_Address_Type), a source address (Source_Address), an advertising set identification (Advertising_SID), and the like.

In S38, the broadcast assistant sends the broadcast synchronization information (SyncInfo) to the right earbud.

In S39, the right earbud starts synchronizing to the BIS corresponding to the right channel, to enter the music playing state.

In S40, the broadcast assistant searches for the other earbud that is in the same coordinated set as the earbud through the received notification information.

In S41, the broadcast assistant instructs the found target earbud to stop synchronizing to the BIS corresponding to the mono channel, and to start synchronizing to the BIS corresponding to the left channel, to enter the binaural playback mode.

The schemes in the embodiments of the present disclosure support switching between monaural playback and binaural playback of TWS Bluetooth headsets based on LE broadcast audio, ensuring that TWS products based on next-generation Bluetooth audio provide good consuming user experience.

Figure 7:
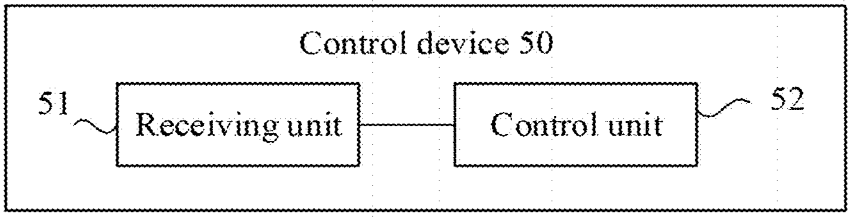
FIG. 7 is a schematic block diagram of a control device according to an embodiment of the present disclosure.

FIG. 7 is a schematic block diagram of a control device 50 according to an embodiment of the present disclosure. The control device 50 may include the following.

- a receiving unit 51, configured to receive notification information from a first broadcast sink; and
- a control unit 52, configured to control a Broadcast Isochronous Stream (BIS) synchronized to by a second broadcast sink based on the notification information.

Figure 8:
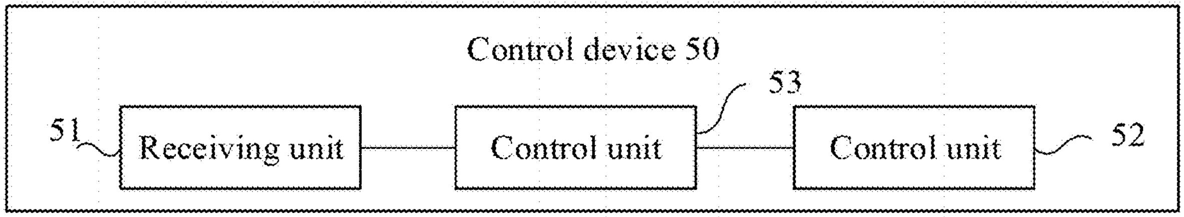
FIG. 8 is a schematic block diagram of a control device according to another embodiment of the present disclosure.

Optionally, as shown in FIG. 8, the control device further includes:

- a search unit 53, configured to search for a second broadcast sink in the same coordinated set as the first broadcast sink.

Optionally, the notification information is used to notify the control device that the first broadcast sink stops synchronizing to periodic advertising, and the control unit is further configured to instruct the second broadcast sink to stop synchronizing to the BIS corresponding to a second channel, and to start synchronizing to the BIS corresponding to a mono channel.

Optionally, the notification information is used to request the control device to send broadcast synchronization information, and the control unit is further configured to send the broadcast synchronization information to the first broadcast sink to instruct the first broadcast sink to start synchronizing to the BIS corresponding to a first channel.

Optionally, the control unit is further configured to instruct the second broadcast sink to stop synchronizing to the BIS corresponding to the mono channel, and to start synchronizing to the BIS corresponding to the second channel.

Optionally, the notification information includes at least one of a source address type, a source address and an advertising set identification.

Optionally, the first broadcast sink and the second broadcast sink are earbud devices.

Optionally, the first channel is a left channel, the second channel is a right channel, the first broadcast sink is a left earbud device, and the second broadcast sink is a right earbud device.

Optionally, the first channel is a right channel, the second channel is a left channel, the first broadcast sink is a right earbud device, and the second broadcast sink is a left earbud device.

Optionally, the control unit is further configured to establish a synchronization relationship between the broadcast source and the first and second broadcast sinks, so as to instruct the first broadcast sink to synchronize to the BIS corresponding to the first channel and the second broadcast sink to synchronize to the BIS corresponding to the second channel.

Optionally, the control device is a broadcast assistant.

Optionally, the control device includes a broadcast source and a broadcast assistant.

Optionally, the periodic advertising received by the broadcast assistant from the broadcast source includes at least one of the following BISs:

- a BIS corresponding to the first channel;
- a BIS corresponding to the second channel; and
- a BIS corresponding to the mono channel.

Optionally, the broadcast source is a broadcast audio source, and the broadcast sink is a broadcast audio sink.

The control device 50 in the embodiment of the present disclosure can implement the corresponding functions of the control device in the foregoing method embodiments. For the processes, functions, implementations and beneficial effects corresponding to each module (sub-module, unit or component, etc.) in the control device 50, reference can be made to the corresponding descriptions in the above method embodiments, details of which will not be repeated here. It should be noted that the functions described in respect to various modules (sub-modules, units or components, etc.) in the control device 50 of the embodiment of the present disclosure can be implemented by different modules (sub-modules, units or components, etc.), or by the same module (sub-module, unit or component, etc.).

Figure 9:
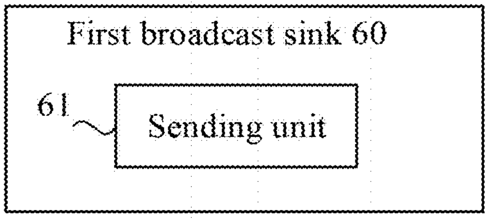
FIG. 9 is a schematic block diagram of a first broadcast sink according to an embodiment of the present disclosure.

FIG. 9 is a schematic block diagram of a first broadcast sink 60 according to an embodiment of the present disclosure. The first broadcast sink 60 may include:

a sending unit 61, configured to send notification information to a control device;

wherein the notification information is used to indicate the control device to control a Broadcast Isochronous Stream (BIS) synchronized to by a second broadcast sink.

Optionally, the second broadcast sink is in the same coordinated set as the first broadcast sink.

Figure 10:
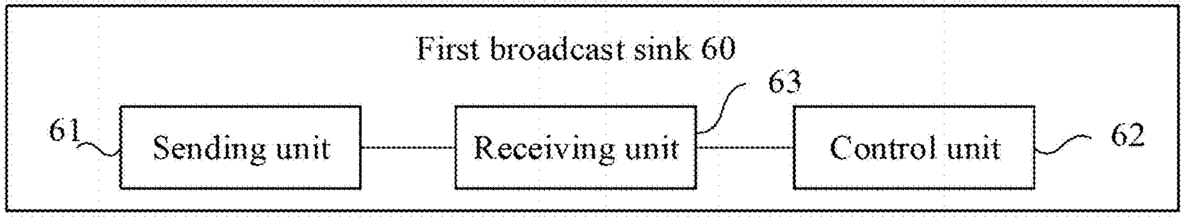
FIG. 10 is a schematic block diagram of a first broadcast sink according to another embodiment of the present disclosure.

Optionally, as shown in FIG. 10, the first broadcast sink further includes:

a control unit 62, configured to stop synchronizing to periodic advertising, wherein the notification information is used to notify the control device that the first broadcast sink stops synchronizing to the periodic advertising.

Optionally, the notification information is used to request the control device to send broadcast synchronization information, and the first broadcast sink further includes:

a receiving unit 63, configured to receive the broadcast synchronization information from the control device, and to start synchronizing to the BIS corresponding to the first channel.

Optionally, the first broadcast sink and the second broadcast sink are earbud devices.

Optionally, the first channel is a left channel, the second channel is a right channel, the first broadcast sink is a left earbud device, and the second broadcast sink is a right earbud device.

Optionally, the first channel is a right channel, the second channel is a left channel, the first broadcast sink is a right earbud device, and the second broadcast sink is a left earbud device.

Optionally, the control device is a broadcast assistant.

Optionally, the control device includes a broadcast source and a broadcast assistant.

Optionally, the periodic advertising received by the broadcast assistant from the broadcast source includes at least one of the following BISs:

a BIS corresponding to the first channel;

a BIS corresponding to the second channel; and a BIS corresponding to the mono channel.

Optionally, the broadcast source is a broadcast audio source, and the broadcast sink is a broadcast audio sink.

The first broadcast sink 60 in the embodiment of the present disclosure can implement the corresponding functions of the first broadcast sink in the foregoing method embodiments. For the processes, functions, implementations and beneficial effects of each module (sub-module, unit or component, etc.) in the first broadcast sink 60, reference can be made to the corresponding description in the above method embodiments, details of which are not repeated here. It should be noted that the functions described in respect to the modules (sub-modules, units or components, etc.) in the first broadcast sink 60 of the embodiments of the present disclosure can be implemented by different modules (sub-modules, units or components, etc.), or can be implemented by the same module (sub-module, unit or component, etc.).

Figure 11:
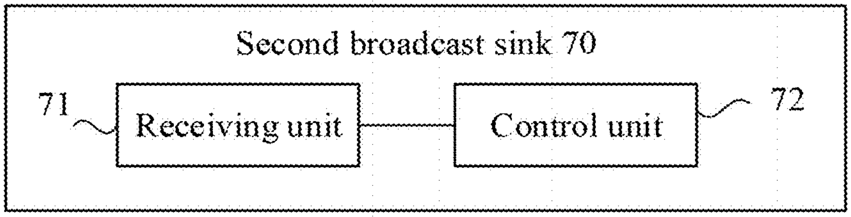
FIG. 11 is a schematic block diagram of a second broadcast sink according to an embodiment of the present disclosure.

FIG. 11 is a schematic block diagram of a second broadcast sink 70 according to an embodiment of the present disclosure. The second broadcast sink 70 may include:

a receiving unit 71, configured to receive indication information from a control device, wherein the indication information is determined by the control device based on notification information of a first broadcast sink; and a control unit 72, configured to synchronize to a Broadcast Isochronous Stream (BIS) based on the indication information.

Optionally, the notification information is used to notify the control device that the first broadcast sink stops synchronizing to periodic advertising, and the control unit is further configured to stop synchronizing to the BIS corresponding to a second channel, and start synchronizing to the BIS corresponding to a mono channel.

Optionally, the notification information is used to request the control device to send broadcast synchronization information, and the control unit is further configured to stop synchronizing to the BIS corresponding to the mono channel, and start synchronizing to the BIS corresponding to the second channel.

Optionally, the first broadcast sink and the second broadcast sink are earbud devices.

Optionally, the first channel is a left channel, the second channel is a right channel, the first broadcast sink is a left earbud device, and the second broadcast sink is a right earbud device.

Optionally, the first channel is a right channel, the second channel is a left channel, the first broadcast sink is a right earbud device, and the second broadcast sink is a left earbud device.

Optionally, the control device is a broadcast assistant.

Optionally, the control device includes a broadcast source and a broadcast assistant.

Optionally, the periodic advertising received by the broadcast assistant from the broadcast source includes at least one of the following BISs:

a BIS corresponding to the first channel;

a BIS corresponding to the second channel; and a BIS corresponding to the mono channel.

Optionally, the broadcast source is a broadcast audio source, and the broadcast sink is a broadcast audio sink.

The second broadcast sink 70 in the embodiment of the present disclosure can implement the corresponding functions of the second broadcast sink in the foregoing method embodiments. For the processes, functions, implementations and beneficial effects of each module (sub-module, unit or component, etc.) in the second broadcast sink 70, reference can be made to the corresponding description in the above method embodiments, details of which are not repeated here. It should be noted that the functions described in respect to the modules (sub-modules, units or components, etc.) in the second broadcast sink 70 of the embodiments of the present disclosure can be implemented by different modules (sub-modules, units or components, etc.), or can be implemented by the same module (sub-module, unit or component, etc.).

Figure 12:
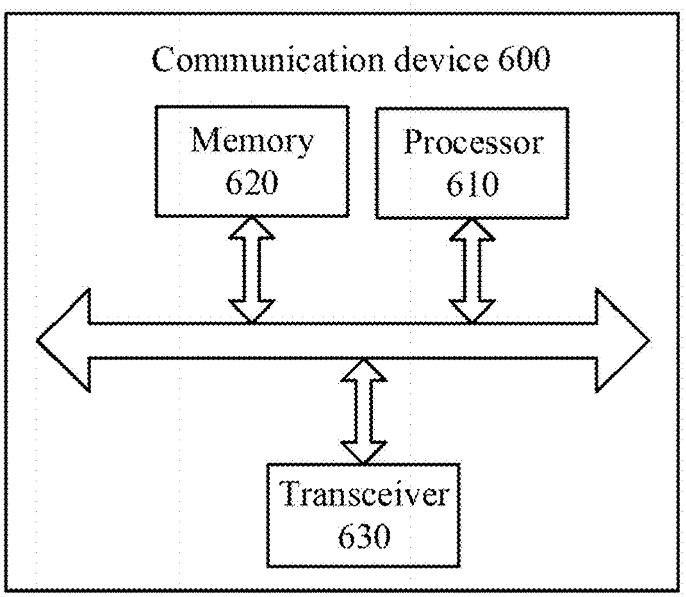
FIG. 12 is a schematic block diagram of a communication device according to an embodiment of the present disclosure.

FIG. 12 is a schematic structural diagram of a communication device 600 according to an embodiment of the present disclosure. The communication device 600 includes a processor 610, and the processor 610 can call and run a computer program from a memory, to cause the communication device 600 to carry out the methods in the embodiments of the present disclosure.

Optionally, the communication device 600 may further include a memory 620. The processor 610 may call and run a computer program from the memory 620, to cause the communication device 600 to implement the methods in the embodiments of the present disclosure. The memory 620 may be a separate device independent of the processor 610, or may be integrated in the processor 610.

Optionally, the communication device 600 may further include a transceiver 630, and the processor 610 may control the transceiver 630 to communicate with other devices, and specifically, to send information or data to the other devices or receive information or data sent by other devices. The transceiver 630 may include a transmitter and a receiver. The transceiver 630 may further include an antenna, and the number of the antennas may be one or more.

Optionally, the communication device 600 may be the control device, the first broadcast sink or the second broadcast sink in the embodiments of the present disclosure, and the communication device 600 may implement corresponding processes implemented by the control device, the first broadcast sink or the second broadcast sink in the methods of the embodiments of the present disclosure, which are not repeated here for the sake of brevity.

Figure 13:
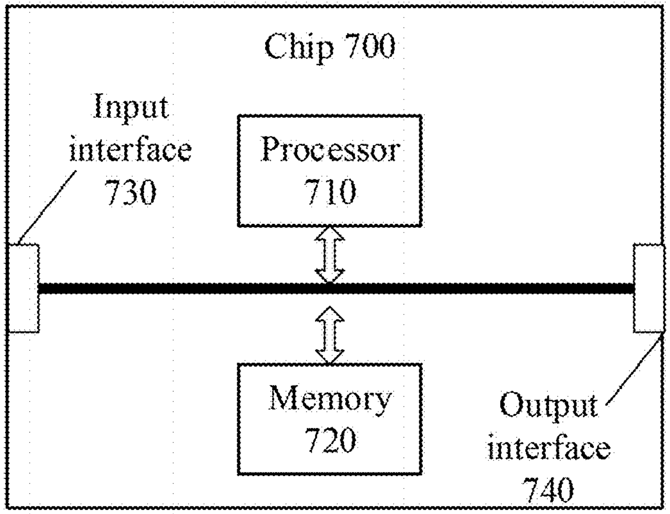
FIG. 13 is a schematic block diagram of a chip according to an embodiment of the present disclosure.

FIG. 13 is a schematic structural diagram of a chip 700 according to an embodiment of the present disclosure. The chip 700 includes a processor 710 which can call and run a computer program from a memory to implement the methods in the embodiments of the present disclosure.

Optionally, the chip 700 may further include a memory 720. The processor 710 can call and run a computer program from the memory 720, so as to implement the methods performed by the control device, the first broadcast sink or the second broadcast sink in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and specifically, to obtain information or data transmitted by other devices or chips.

Optionally, the chip 700 can further include an output interface 740. The processor 710 can control the output interface 740 to communicate with other devices or chips, and specifically, to output information or data to other devices or chips.

Optionally, the chip may be applied to the control device, the first broadcast sink or the second broadcast sink in the embodiments of the present disclosure, and the chip may implement corresponding processes implemented by the control device, the first broadcast sink or the second broadcast sink in the methods of the embodiments of the present disclosure, which are not repeated here for the sake of brevity.

The chip applied to the control device, the first broadcast sink or the second broadcast sink may be the same chip or different chips.

It should be understood that the chip mentioned in the embodiments of the present disclosure can also be referred to as a system-level chip, a system chip, a chip system, or a system-on-chip.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor.

The memory mentioned above may be either volatile memory or non-volatile memory, or may include both volatile and non-volatile memories. The non-volatile memory may be a read-only memory (ROM), a programmable read-only memory (PROM), an erasable programmable read-only memory (EPROM), an electrically programmable erase programmable read-only memory (electrically EPROM, EEPROM) or a flash memory. The volatile memory may be a random access memory (RAM).

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), among others. That is to say, the memory in the embodiments of the present disclosure is intended to include but is not limited to these and any other suitable types of memories.

Figure 14:
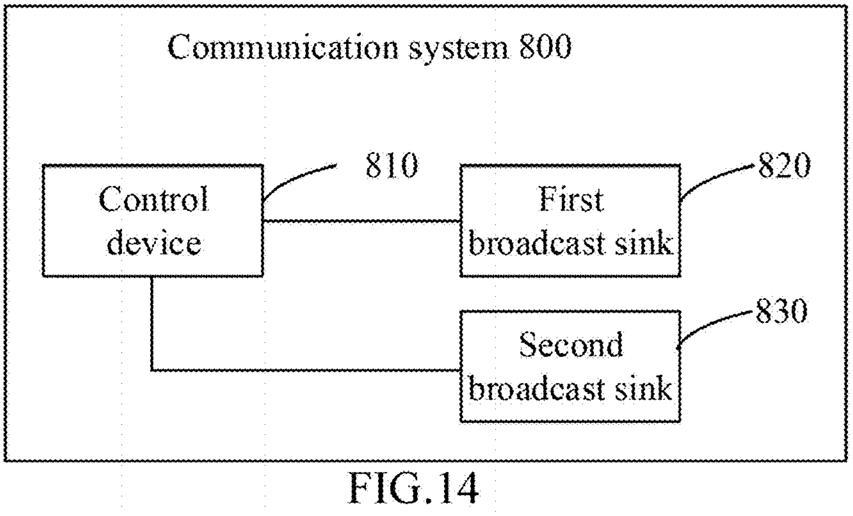
FIG. 14 is a schematic block diagram of a communication system according to an embodiment of the present disclosure.

FIG. 14 is a schematic block diagram of a communication system 800 according to an embodiment of the present disclosure. The communication system 800 includes a control device 810, a first broadcast sink 820 and a second broadcast sink 830.

The control device 810 is configured to receive notification information from the first broadcast sink; and the control device controls a Broadcast Isochronous Stream (BIS) synchronized to by the second broadcast sink based on the notification information.

The first broadcast sink 820 is configured to send the notification information to the control device, where the notification information is used to indicate the control device to control the Broadcast Isochronous Stream (BIS) synchronized to by the second broadcast sink.

The second broadcast sink 830 is configured to receive indication information from the control device, the indication information being determined by the control device based on the notification information of the first broadcast sink; and synchronize to the Broadcast Isochronous Stream (BIS) based on the indication information.

The control device 810 can be configured to implement the corresponding functions implemented by the control device in the above methods, the first broadcast sink 820 can be configured to implement the corresponding functions implemented by the first broadcast sink in the above methods, and the second broadcast sink 830 can be configured to implement corresponding functions implemented by the second broadcast sink in the foregoing methods. For the sake of brevity, details are not repeated here.

In the embodiments of the present disclosure, the BIS to be synchronized to by the second broadcast sink is controlled based on the notification information from the first broadcast sink, which can conveniently support the audio control of the device.

The above embodiments may be implemented entirely or partly by software, hardware, firmware or any combination thereof. When implemented by software, it can be implemented entirely or partly in the form of a computer program product. The computer program product includes one or more computer instructions. When the computer program instructions are loaded and executed on the computer, the processes or functions in accordance with the embodiments of the present disclosure are entirely or partly generated. The computer can be a general-purpose computer, a dedicated computer, a computer network, or other programmable devices. The computer instructions can be stored in a computer-readable storage medium, or transmitted from one computer-readable storage medium to another. For example, the computer instructions can be transmitted from a website, a computer, a server, or a data center to another website site, computer, server or data center in a wired manner such as through a coaxial cable, an optical fiber or a digital subscriber line (DSL) or in a wireless manner such as an infrared, wireless, microwave manner or the like. A computer-readable storage medium may be any available medium that can be accessed by a computer or a data storage device such as a server or data center integrated with one or more available media. The available medium may be a magnetic medium (such as a floppy disk, a hard disk, a magnetic tape), an optical medium (such as a DVD), or a semiconductor medium (such as a solid state disk (SSD)).

It should be understood that in the embodiments of the present disclosure, the sequence numbers of the above-mentioned processes do not mean the performing order, and the performing order of the processes should be determined according to the functions and the internal logic thereof, and should not compose any limitation on the implementations of the embodiments of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. An audio control method for Low Energy (LE) broadcast audio, comprising:

receiving, by a control device, notification information from a first broadcast sink;

searching for, by the control device, a second broadcast sink in a same coordinated set as the first broadcast sink; and controlling, by the control device based on the notification information, a Broadcast Isochronous Stream (BIS) synchronized to by the second broadcast sink.

2. The method according to claim 1, wherein the notification information is used to notify the control device that the first broadcast sink stops synchronizing to periodic advertising, and the controlling, by the control device based on the notification information, the BIS synchronized to by the second broadcast sink comprises:

indicating, by the control device, the second broadcast sink to stop synchronizing to the BIS corresponding to a second channel, and to start synchronizing to the BIS corresponding to a mono channel.

3. The method according to claim 1, wherein the notification information is used to request the control device to send broadcast synchronization information, and the method further comprises:

sending, by the control device, the broadcast synchronization information to the first broadcast sink to indicate the first broadcast sink to start synchronizing to the BIS corresponding to a first channel, wherein the controlling, by the control device based on the notification information, the BIS synchronized to by the second broadcast sink comprises:

indicating, by the control device, the second broadcast sink to stop synchronizing to the BIS corresponding to a mono channel, and to start synchronizing to the BIS corresponding to a second channel.

4. The method according to claim 3, wherein the notification information includes at least one of a broadcast source address type, a broadcast source address, an advertising set identification and a periodic advertising synchronization state.

5. The method according to claim 3, wherein the first broadcast sink and the second broadcast sink are earbud devices, wherein the first channel is a left channel, the second channel is a right channel, the first broadcast sink is a left earbud device, and the second broadcast sink is a right earbud device, or wherein the first channel is a right channel, the second channel is a left channel, the first broadcast sink is a right earbud device, and the second broadcast sink is a left earbud device.

6. The method according to claim 1, further comprising:

establishing, by the control device, a synchronization relationship between a broadcast source and the first and second broadcast sinks, so as to indicate the first broadcast sink to synchronize to the BIS corresponding to a first channel and the second broadcast sink to synchronize to the BIS corresponding to a second channel.

7. The method according to claim 1, wherein the control device is a broadcast assistant, or the control device comprises a broadcast source and a broadcast assistant, and wherein periodic advertising received by the broadcast assistant from a broadcast source comprises at least one of the following BISs:

a BIS corresponding to a first channel;

a BIS corresponding to a second channel; and a BIS corresponding to a mono channel different from the first channel and the second channel.

8. The method according to claim 1, wherein the notification information carries indication information of a monaural playback mode or a binaural playback mode.

9. An audio control method for Low Energy (LE) broadcast audio, comprising:

sending, by a first broadcast sink, notification information to a control device;

wherein the notification information is used to indicate the control device to control a Broadcast Isochronous Stream (BIS) synchronized to by a second broadcast sink, and wherein the second broadcast sink is in the same coordinated set as the first broadcast sink.

10. The method according to claim 9, further comprising:

stopping, by the first broadcast sink, synchronizing to periodic advertising, wherein the notification information is used to notify the control device that the first broadcast sink stops synchronizing to the periodic advertising.

11. The method according to claim 9, wherein the notification information is used to request the control device to send broadcast synchronization information, and the method further comprises:

receiving, by the first broadcast sink, the broadcast synchronization information from the control device, and starting to synchronize to the BIS corresponding to a first channel.

12. The method according to claim 9, wherein the control device is a broadcast assistant, or the control device comprises a broadcast source and a broadcast assistant, and wherein periodic advertising received by the broadcast assistant from a broadcast source comprises at least one of the following BISs:

a BIS corresponding to a first channel;

a BIS corresponding to a second channel; and a BIS corresponding to a mono channel different from the first channel and the second channel.

13. The method according to claim 9, wherein the notification information carries indication information of a monaural playback mode or a binaural playback mode.

14. An audio control method for Low Energy (LE) broadcast audio, comprising:

receiving, by a second broadcast sink, indication information from a control device, wherein the indication information is determined by the control device based on notification information of a first broadcast sink; and synchronizing, by the second broadcast sink, to a Broadcast Isochronous Stream (BIS) based on the indication information;

wherein the second broadcast sink is in the same coordinated set as the first broadcast sink.

15. The method according to claim 14, wherein the notification information is used to notify the control device that the first broadcast sink stops synchronizing to periodic advertising, and the synchronizing, by the second broadcast sink, to the BIS based on the indication information comprises:

stopping, by the second broadcast sink, synchronizing to the BIS corresponding to a second channel, and starting synchronizing to the BIS corresponding to a mono channel.

16. The method according to claim 14, wherein the notification information is used to request the control device to send broadcast synchronization information, and the synchronizing, by the second broadcast sink, to the BIS based on the indication information comprises:

stopping, by the second broadcast sink, synchronizing to the BIS corresponding to a mono channel, and starting synchronizing to the BIS corresponding to a second channel.

17. The method according to claim 16, wherein the first broadcast sink and the second broadcast sink are earbud devices, and wherein the second channel is a right channel, the first broadcast sink is a left earbud device, and the second broadcast sink is a right earbud device, or wherein the second channel is a left channel, the first broadcast sink is a right earbud device, and the second broadcast sink is a left earbud device.

18. The method according to claim 14, wherein the notification information carries indication information of a monaural playback mode or a binaural playback mode.

* * * * *